US011663461B2

(12) United States Patent
Penner et al.

(10) Patent No.: US 11,663,461 B2
(45) Date of Patent: May 30, 2023

(54) INSTRUCTION DISTRIBUTION IN AN ARRAY OF NEURAL NETWORK CORES

(71) Applicant: INTERNATIONAL BUSINESS MACHINES CORPORATION, Armonk, NY (US)

(72) Inventors: Hartmut Penner, San Jose, CA (US); Dharmendra S. Modha, San Jose, CA (US); John V. Arthur, Mountain View, CA (US); Andrew S. Cassidy, San Jose, CA (US); Rathinakumar Appuswamy, San Jose, CA (US); Pallab Datta, San Jose, CA (US); Steven K. Esser, San Jose, CA (US); Myron D. Flickner, San Jose, CA (US); Jennifer Klamo, San Jose, CA (US); Jun Sawada, Austin, TX (US); Brian Taba, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1286 days.

(21) Appl. No.: 16/028,158

(22) Filed: Jul. 5, 2018

(65) Prior Publication Data
US 2020/0012929 A1 Jan. 9, 2020

(51) Int. Cl.
*G06N 3/08* (2023.01)
*G06N 5/046* (2023.01)
*G06N 3/045* (2023.01)

(52) U.S. Cl.
CPC ............... *G06N 3/08* (2013.01); *G06N 3/045* (2023.01); *G06N 5/046* (2013.01)

(58) Field of Classification Search
CPC ......... G06N 3/08; G06N 3/0454; G06N 5/046
See application file for complete search history.

(56) References Cited

U.S. PATENT DOCUMENTS

| 5,524,175 A * | 6/1996 | Sato ..................... G06N 3/063 706/41 |
| 9,082,078 B2 | 7/2015 | Palmer et al. |

(Continued)

FOREIGN PATENT DOCUMENTS

| CN | 106650922 A | 5/2017 |
| CN | 107016175 A | 8/2017 |

(Continued)

OTHER PUBLICATIONS

Akopyan et al., "TrueNorth: Design and Tool Flow of a 65 mW 1 Million Neuron Programmable Neurosynaptic Chip," Oct. 2015, IEEE Transactions on Computer-Aided Design of Integrated Circuits and Systems, vol. 34, No. 10, pp. 1537-1557 (Year: 2015).*

(Continued)

*Primary Examiner* — Li Wu Chang
(74) *Attorney, Agent, or Firm* — Stephen J. Kenny; Erik A. Huestis; Foley Hoag, LLP

(57) ABSTRACT

Instruction distribution in an array of neural network cores is provided. In various embodiments, a neural inference chip is initialized with core microcode. The chip comprises a plurality of neural cores. The core microcode is executable by the neural cores to execute a tensor operation of a neural network. The core microcode is distributed to the plurality of neural cores via an on-chip network. The core microcode is executed synchronously by the plurality of neural cores to compute a neural network layer.

25 Claims, 16 Drawing Sheets

(56) References Cited

U.S. PATENT DOCUMENTS

| | | | |
|---|---|---|---|
| 9,552,327 | B2 | 1/2017 | Palmer et al. |
| 9,710,265 | B1 | 7/2017 | Temam et al. |
| 2017/0140265 | A1 | 5/2017 | Le et al. |
| 2017/0169326 | A1 | 6/2017 | Diamos et al. |
| 2017/0185888 | A1 | 6/2017 | Chen et al. |
| 2020/0012929 | A1 | 1/2020 | Penner et al. |
| 2020/0104573 | A1* | 4/2020 | Chen .................. G06F 3/011 |
| 2020/0126555 | A1* | 4/2020 | Chen .................. G06F 3/167 |
| 2021/0406649 | A1* | 12/2021 | Zhang ................ G06N 20/00 |

FOREIGN PATENT DOCUMENTS

| | | |
|---|---|---|
| TW | 201805858 A | 2/2018 |
| WO | 2017124642 A1 | 7/2017 |

OTHER PUBLICATIONS

Merolla et al., "A multicast tree router for multichip neuromorphic systems," Mar. 2014, IEEE Trans. Circuits Syst. I, Reg. Papers, vol. 61, No. 3, pp. 820-833 (Year: 2014).*
Davies et al. "Loihi: A Neuromorphic Manycore Processor with On-Chip Learning", IEEE CS, Jan./Feb. 2018, pp. 82-99.*
Painkras, E., Plana, L., Garside, J. et al. (2013). SpiNNaker: A 1-W 18-core system-on-chip for massively-parallel neural network simulation. IEEE Journal of Solid-State Circuits, 48(8), pp. 1943-1953.
Chen, X., Lu, Z., Jantsch, A. et al. (2010). Supporting distributed shared memory on multi-core network-on-chips using a dual microcoded controller. Proceedings of the Conference on Design, Automation and Test in Europe, pp. 39-44.

* cited by examiner

INSTRUCTION DISTRIBUTION IN AN ARRAY OF NEURAL NETWORK CORES

BACKGROUND

Embodiments of the present disclosure relate to coordinated computation of neural network layers across arrays of neural cores, and more specifically to instruction distribution in an array of neural network cores.

BRIEF SUMMARY

According to embodiments of the present disclosure, methods of and computer program products for instruction distribution in an array of neural network cores are provided. In various embodiments, a neural inference chip is initialized with core microcode. The chip comprises a plurality of neural cores. The core microcode is executable by the neural cores to execute a tensor operation of a neural network. The core microcode is distributed to the plurality of neural cores via an on-chip network. The core microcode is executed synchronously by the plurality of neural cores to compute a neural network layer.

DETAILED DESCRIPTION

Figure 1:
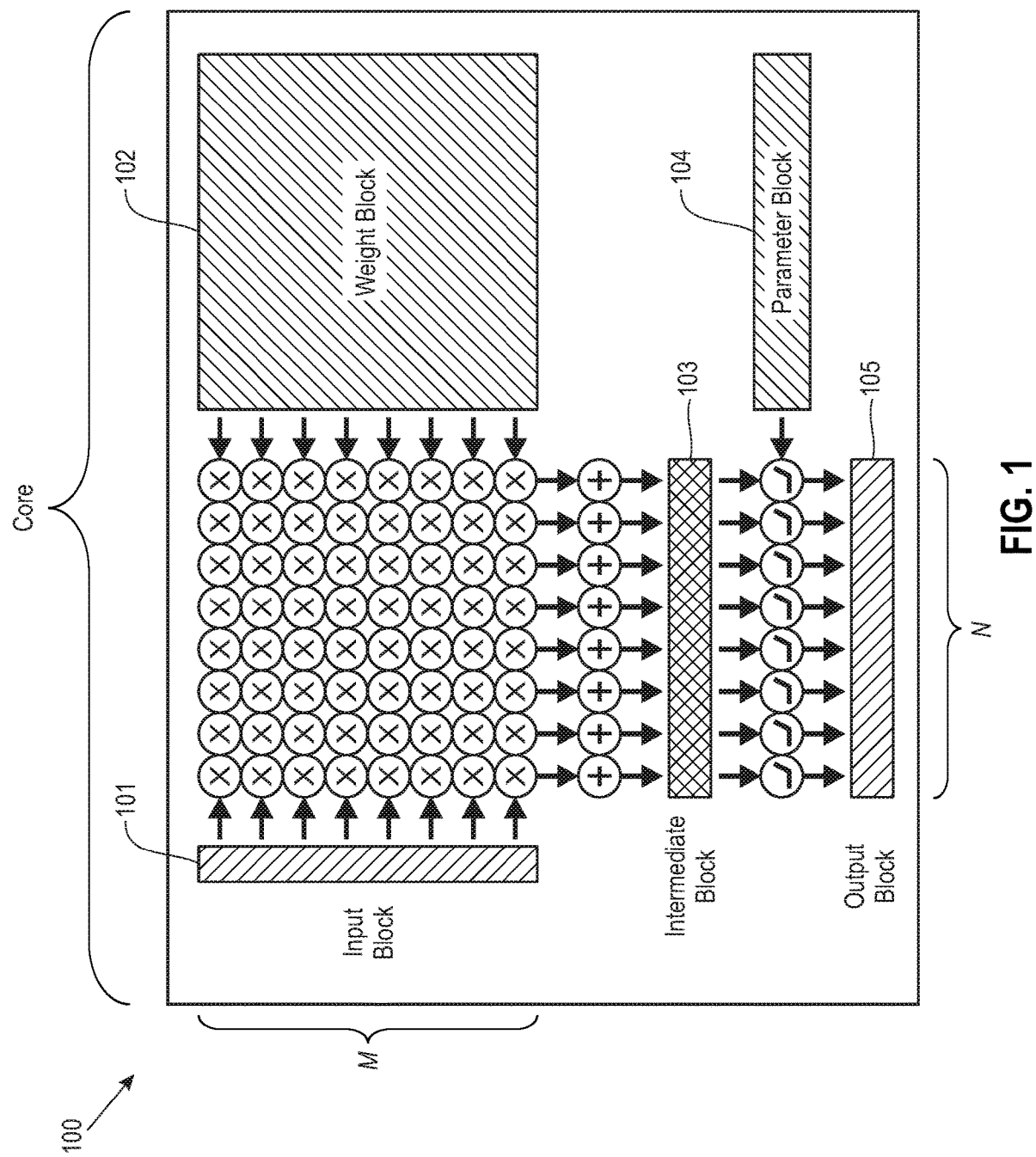
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function a.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function $Y[i, j, k] = \sigma(Z[i, j, k]) = Z[i, j, k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
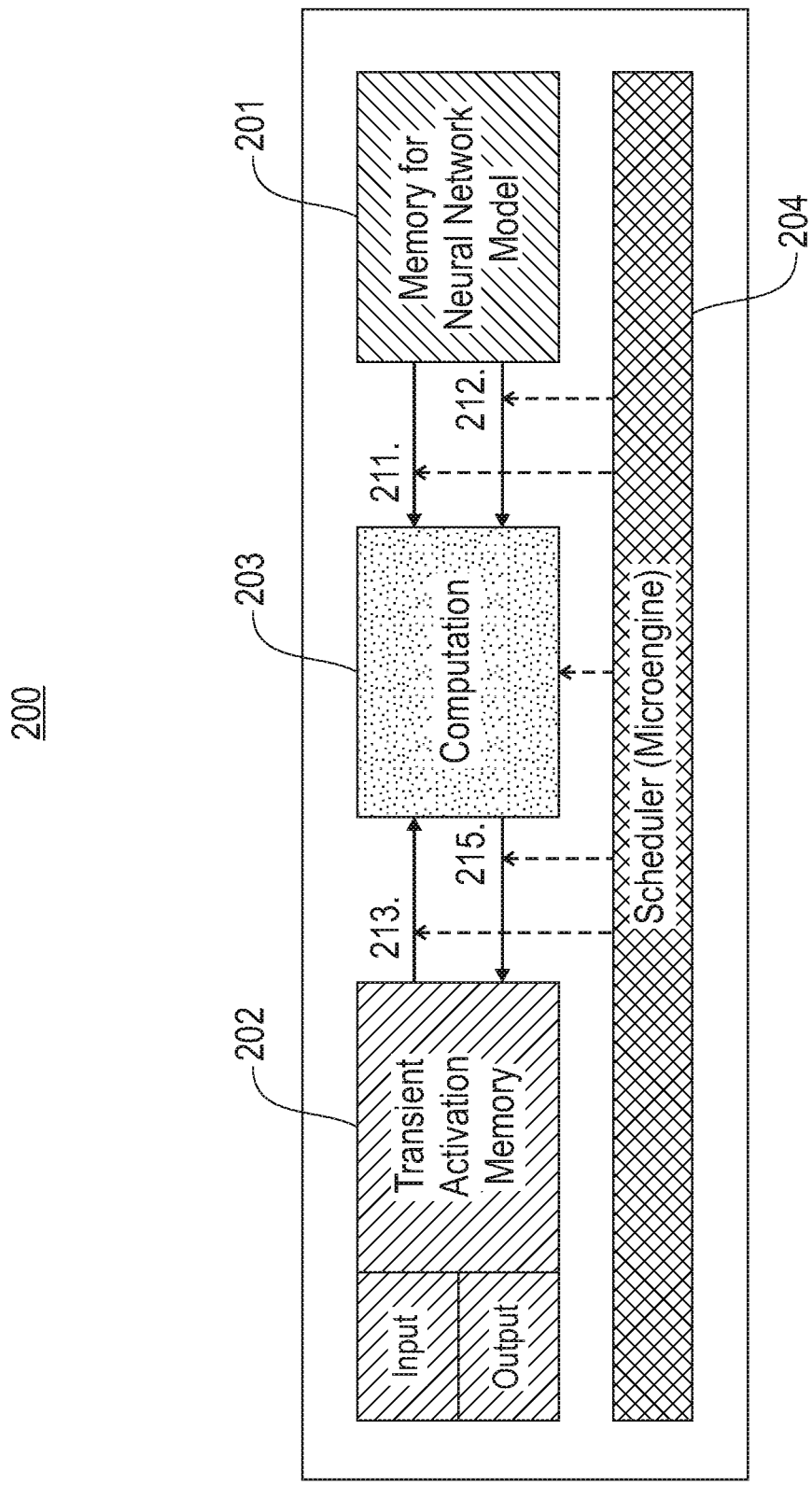
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a scheduler 204 is included in IPU 200. In such embodiments, all operations in the IPU are directed by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

Figure 3:
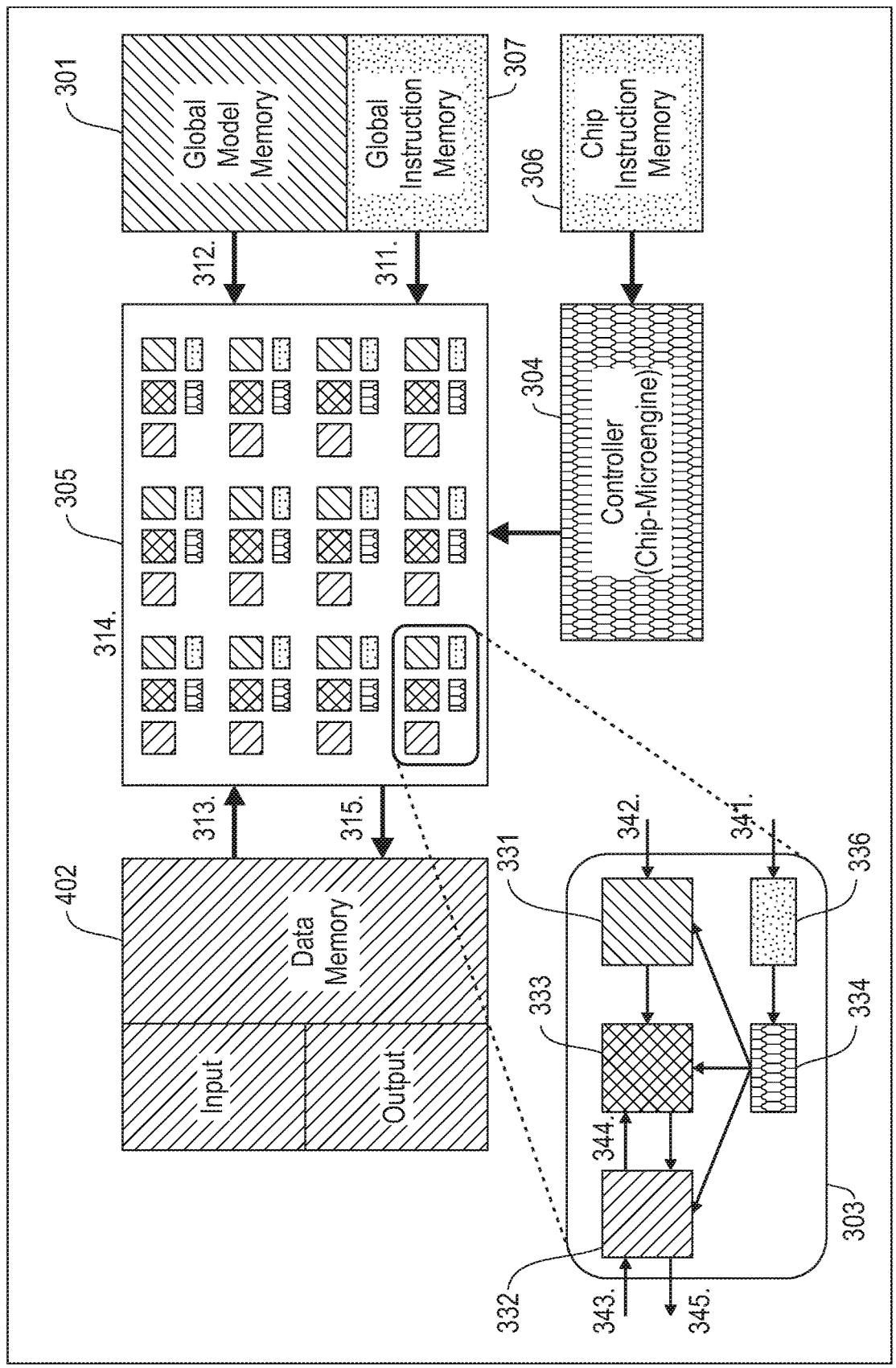
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a model memory 301 for the neural network model. As described above, the neural network model may include the synapse weights for a neural network to be computed. IPU 300 includes an activation memory 302, which may be transient. Activation memory 302 may be divided into input and output regions, and stores neuron activations for processing. In some embodiments, IPU 300 includes an instruction memory 307 for storing chip-level instructions.

IPU 300 includes a plurality of cores 303 in an array 305. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

In various embodiments a global scheduler 304 is included in IPU 300. In various embodiments, a local core controller 334 is included on each core 303. In such embodiments, the direction of operations is shared between the global scheduler (chip microengine) and the local core controller (core microengine). In some embodiments, a chip-level instruction memory 306 is provided for storing chip-level instruction for execution by chip microengine 304. In some embodiments, core 303 includes a core-level instruction memory 336 for storing core-level instructions for execution by core microengine 334.

At 311, compute instructions are loaded from instruction memory 307 to each core 303 by global scheduler 304. At 312, parameters (e.g., neural network/synaptic weights) are loaded from model memory 301 to each core 303 by global scheduler 304. At 313, neural network activation data are loaded from data memory 302 to each core 303 by global scheduler 304. At 314, the cores in matrix 305 perform computation to generate output neuron activations. In particular, the computation comprises applying the input synaptic weights to the input activations. It will be appreciated that various methods are available for performing such computations, including in silico dendrites, as well as vector multiplication units. At 315, the results from computation are stored in data memory 302. These stages may be pipelined, in order to provide efficient usage of the neural computation unit on each core.

It will be appreciated that inputs and outputs may be transferred from local activation memory 332 to global activation memory 302 according to the requirements of a given neural network. Likewise, the model memory and instruction memory may have both chip-level and core-level components. At the core level, at 341, compute instructions are loaded to local instruction memory 336. At 342, parameters (e.g., neural network/synaptic weights) are loaded to model memory 331. At 343, neural network activation data are loaded to data memory 332. At 344, the computation unit 332 computed output activations or partial sums. At 345, the results from computation are outputted from data memory 332. These stages may be pipelined, in order to provide efficient usage of each core.

Accordingly, the present disclosure provides for runtime scheduling of operations in an Inference Processing Unit (IPU). In some embodiments, the operation scheduler is centralized (single scheduler). In some embodiments, the IPU computation is distributed (performed by an array of cores). In some embodiments, runtime scheduling of operations is hierarchical—both a central scheduler and distributed schedulers participate.

The scheduler or schedulers direct the execution of all operations in the IPU. Each scheduler instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

At configuration time, global instruction memory 307 is loaded with instructions to be executed by core array 305 (these instructions may be referred to as core microcode). Chip-level instruction memory 306 is loaded with instructions to be executed by chip microengine 304 (these instructions may be referred to as chip microcode).

At runtime, the chip microengine 304 initiates transfer of core microcode from global instruction memory 307. Core microcode instructions are distributed from global instruction memory 307 to core instruction memory 336 in cores 303 in core array 305. In some embodiments, the core microcode is distributed through a network on chip (NoC). A synchronization event begins the execution of core microengines 334. In some embodiments, the synchronization event is triggered by chip microengine 304. The core microengine 334 reads instructions from core instruction memory 336 and executes microcode. This process is repeated for each layer or frame.

In this way, parallel and distributed computation is provided. Every core in core array 305 computes entirely based on its local instructions, providing parallel and distributed control, without control signals between cores (for example, inter-core synchronization signals).

Figure 4:
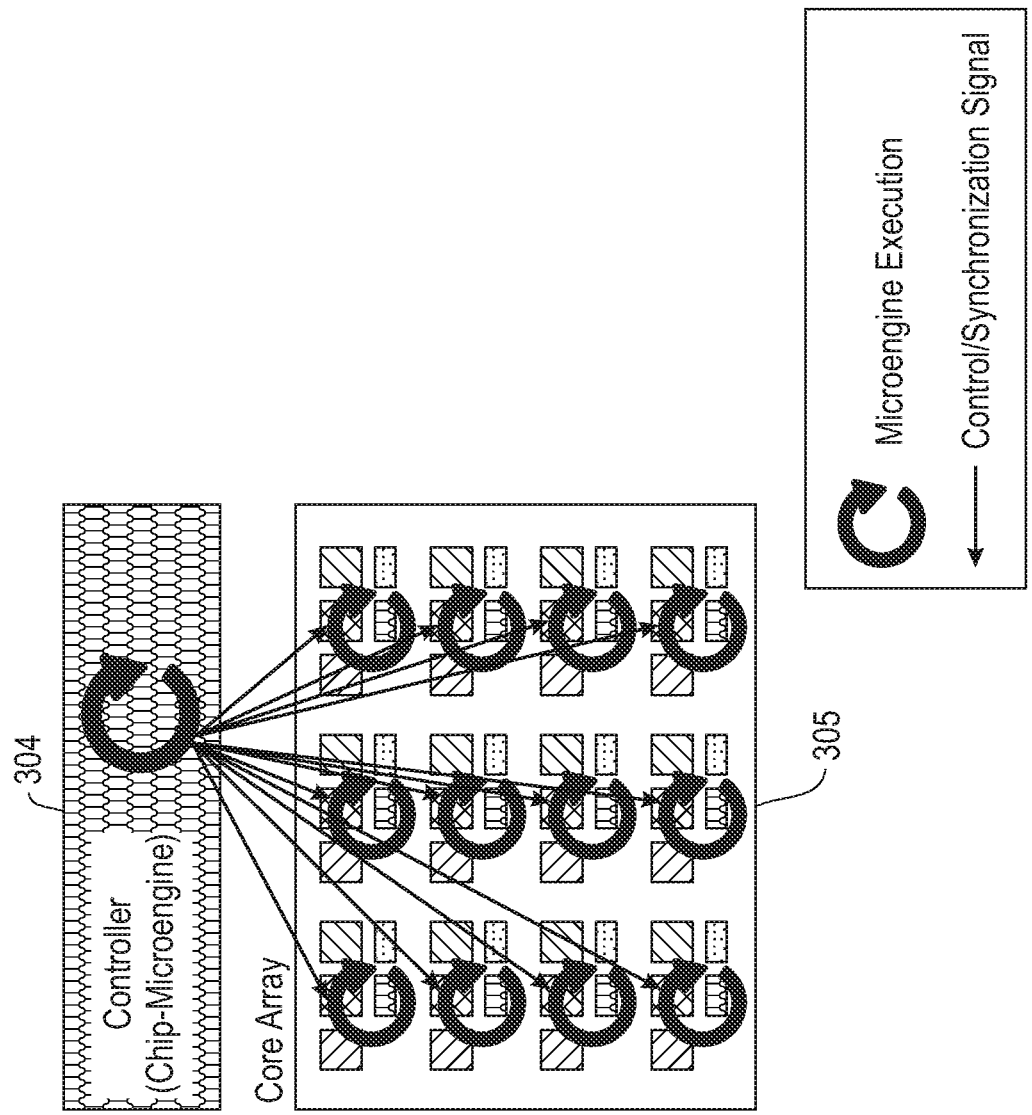
FIG. 4 illustrates an exemplary configuration of parallel and distributed control according to embodiments of the present disclosure.

Referring to FIG. 4, an exemplary configuration of parallel and distributed control is illustrated according to embodiments of the present disclosure. In this example, chip microengine 304 executes chip microcode and distributes a synchronization signal to each core in core array 305. Each core then executes core microcode. In this way, the hierarchical controller(s) synchronize core array 305. No control signals pass between cores. However, as set out above, synchronous data communication is provided between cores.

Figure 5:
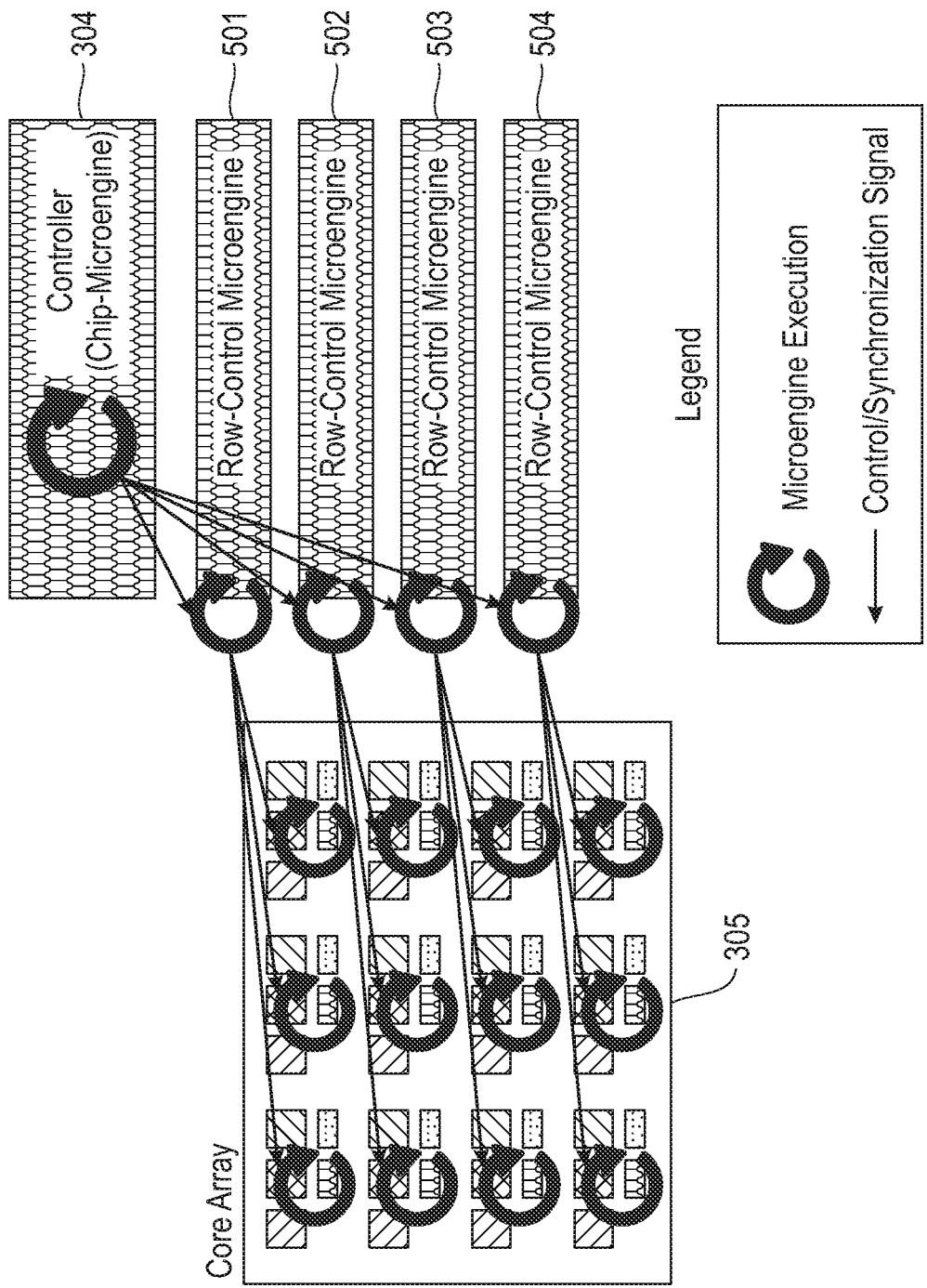
FIG. 5 illustrates an exemplary configuration of hierarchical parallel and distributed control according to embodiments of the present disclosure.

Referring to FIG. 5, an exemplary configuration of hierarchical parallel and distributed control is illustrated according to embodiments of the present disclosure. In this example, chip microengine 304 executes chip microcode and distributes a synchronization signal to each row microengine 501 . . . 504. Each row microengine executes row microcode and distributes the synchronization signal to each core in core array 305. Each core then executes core microcode. In this way, the hierarchical controller(s) synchronize core array 305. No control signals pass between cores. However, as set out above, synchronous data communication is provided between cores.

In distributed neural core execution according to embodiments of the present disclosure, each neural core implements a part of the larger neural network model. The cores collaborate and cooperate via exchanging data to achieve the full result. In various embodiments described above, data exchange is provided via an on-chip network interconnecting the neural cores.

For each neural network layer computation, each neural core is loaded with core microcode that implements the local neural layer function. In various embodiments, the core microcode is similar or identical across cores. The core microcode for each neural core and layer is stored in global instruction memory. In some embodiments, neural cores are loaded with identical core microcode, which uses neural core configuration parameter to specialize the operations of the core. In some embodiments, each neural core gets unique code.

In some embodiments, each neural core includes core instruction memory 336 for storing the core microcode for an entire layer. In other embodiments the core microcode is updated concurrently with execution. In some embodiments, core instruction memory 336 includes multiple banks, enabling instruction update and execution in parallel.

Each neural core executes its core microcode synchronously with all other neural cores in the array, orchestrated by one or more controller.

The chip-level microengine 304 executes chip microcode, which is stored in the chip instruction memory 306 and fetched during execution by chip microengine 304. In some embodiments, as pictured above, the chip-level controller is part of a hierarchy of distributed controllers, including a top-level chip-level microengine 304, and row microengines 501 . . . 504, which each control a row of the core array/global instruction memory.

Figure 6:
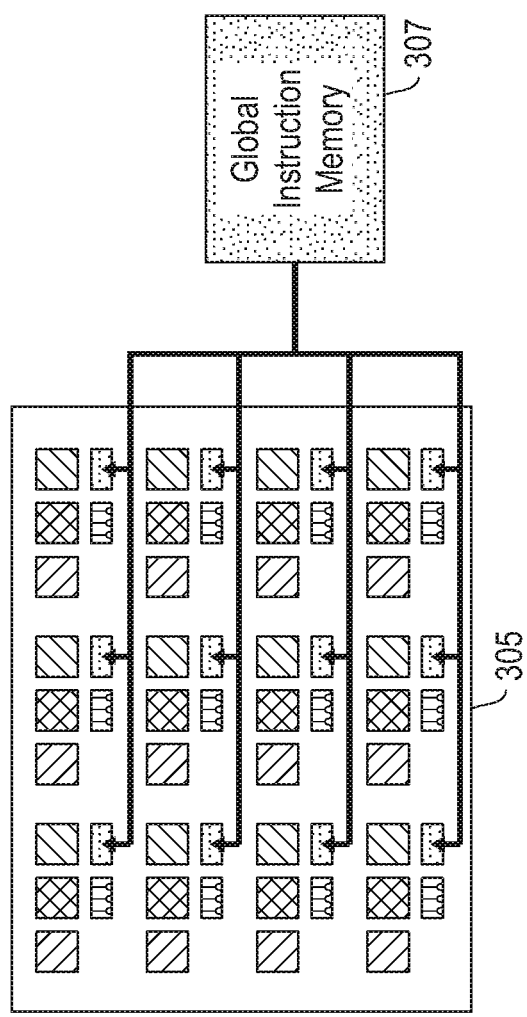
FIGS. 6-12 illustrate exemplary network topologies for instruction distribution to neural cores according to embodiments of the present disclosure.
Figure 7:
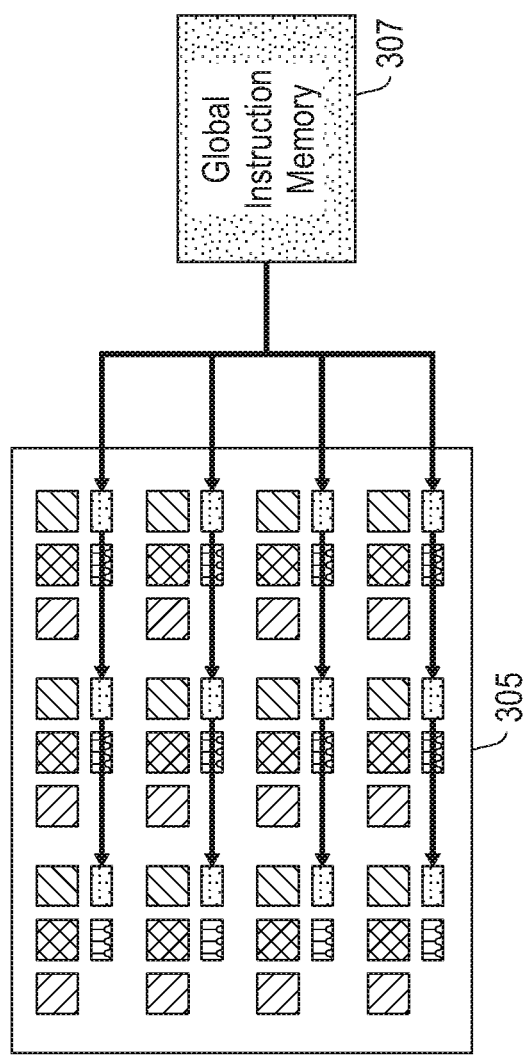
Figure 8:
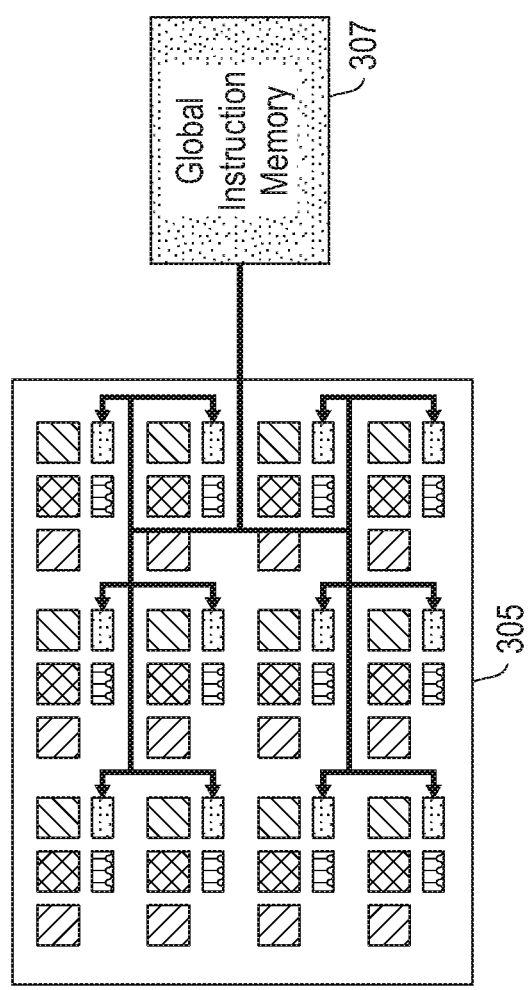
Figure 9:
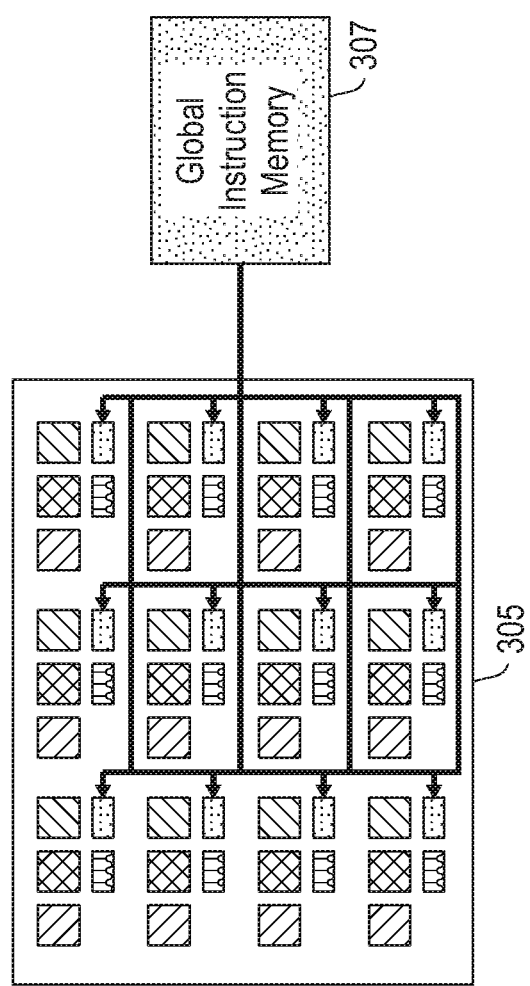
Figure 10:
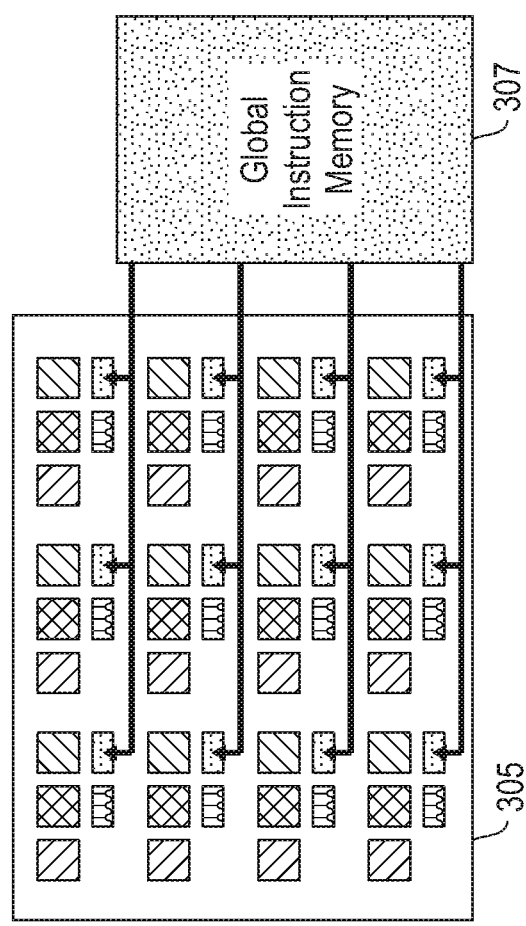
Figure 11:
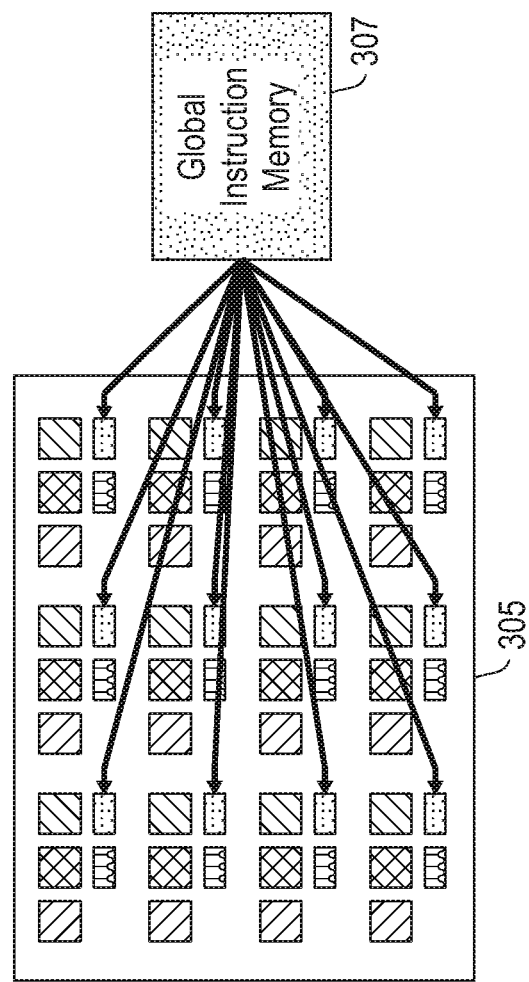
Figure 12:
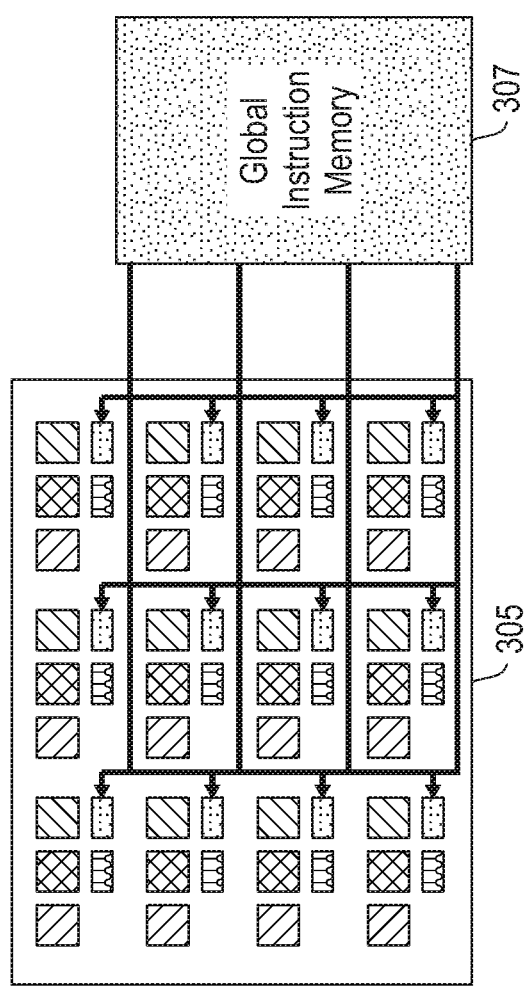

Referring to FIGS. 6-12, exemplary network topologies for instruction distribution to neural cores are illustrated according to embodiments of the present disclosure. FIG. 6 illustrates a bus topology. FIG. 7 illustrates a systolic topology. FIG. 8 illustrates a tree topology. FIG. 9 illustrates a 2D mesh topology. FIG. 10 illustrates a row bus topology. FIG. 11 illustrates a switched topology. FIG. 12 illustrates a multiport mesh topology.

These network topologies enable sending core microcode to one, some, or all neural cores within array 305 with a single send operation. In some embodiments, the instruction distribution network reduces fan-out by having multiple independent buses that can be operated in parallel, enabling a faster distribution of core microcode to all cores. Shared buses are well suited for broadcast distribution, where the same instructions are being sent to all cores. Multiple independent buses are well suited for unique distribution, where unique instructions are being sent to each core. Hybrid buses can operate in both broadcast distribution and unique distribution mode. It will be appreciated that a variety of additional buses may be used according to the present disclosure. Likewise, the various network configurations described above may be combined to form a combination topology.

Various distribution addressing may be used according to embodiments of the present disclosure. In some embodiments, destination addressing is used. In destination addressing, instruction packets are sent to specific cores or sets of cores based on the destination address(es) in the packet. In some embodiments, multicast addressing is used. In multicast addressing, instruction packets are broadcast to multiple/all cores, and cores accept the instruction packets based on an address code(s) in the packet.

In multicast embodiments, each neural core is programmed at configuration time with a code to specify which core microcode packets to accept. Each packet with core microcode has a header that indicates whether and where the core should store the code in local instruction memory. Using a sequence of send operation with different header patterns, updates may be provided to all cores, even when only broadcast is available.

In various embodiments, each core microcode packet contains a header and a body. In some embodiments, the header includes neural core address(es) and an offset in core instruction memory. The body comprises one or more core microcode instructions.

As noted above, various embodiments provide core microcode execution synchronization. After all cores are loaded with microcode instructions, the execution at each core is started. In various embodiments, the schedule is predetermined, and so the execution timing is deterministic. To maintain synchronization between cores without synchronization signals between cores, all cores begin execution at the same point in time.

In various embodiments, in-band synchronization is provided. In such embodiments, a start command is sent via the same on chip network that is used for instruction distribution. This message instructs each receiving core to start simultaneous core execution. In some embodiments, out-of-band synchronization is provided instead. In such embodiments, dedicated wires are used to start simultaneous core execution.

Figure 13:
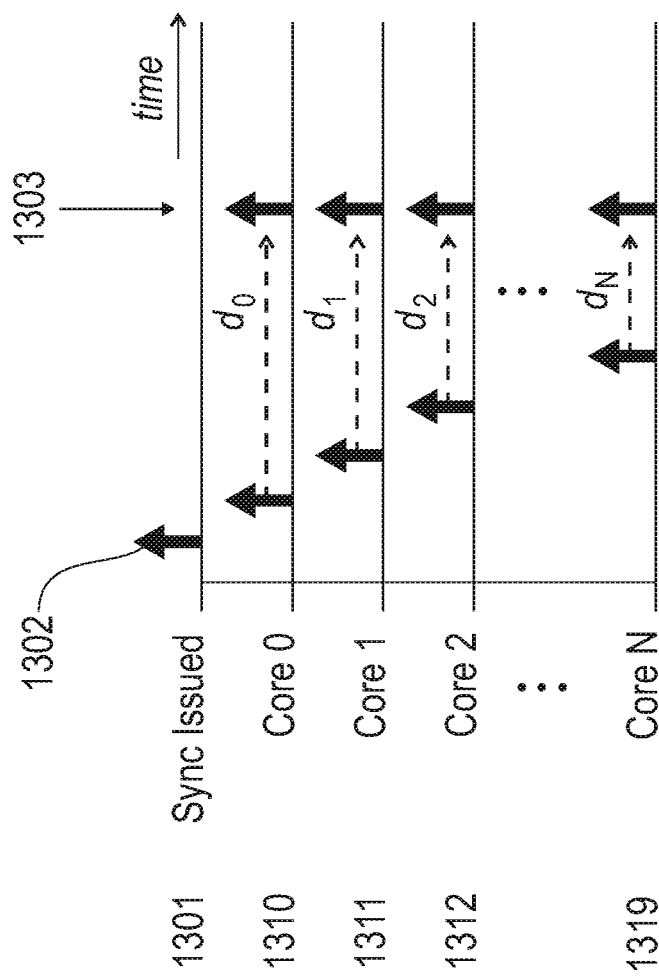
FIG. 13 illustrates synchronization delay equalization according to embodiments of the present disclosure.

Referring now to FIG. 13, synchronization delay equalization is illustrated according to various embodiments of the present disclosure. A synchronization signal 1302 is issued at 1301. Sync signal 1302 arrives at cores 1310 . . . 1319 at different times due to various physical delays. To ensure that cores 1310 . . . 1319 all begin execution at the same time 1303, per core physical delays do . . . dN are equalized. At configuration time, a core offset delay is set for each core. Each core is configured to start execution only after the number of clock cycles corresponding to the offset have elapsed since receiving the sync signal. In some embodiments, the offsets are dynamically programmable.

At runtime, as noted above, the synchronization signal requires different time to propagate to different cores at different physical locations. When the sync signal arrives at a core, the core begins a delay process that expires after the configured delay offset. In some embodiments, the delay process comprises a counter or a delay chain. Once the delay period has expired, core execution begins. By equalizing the delay offsets across cores, all cores begin execution at the same time.

Figure 14:
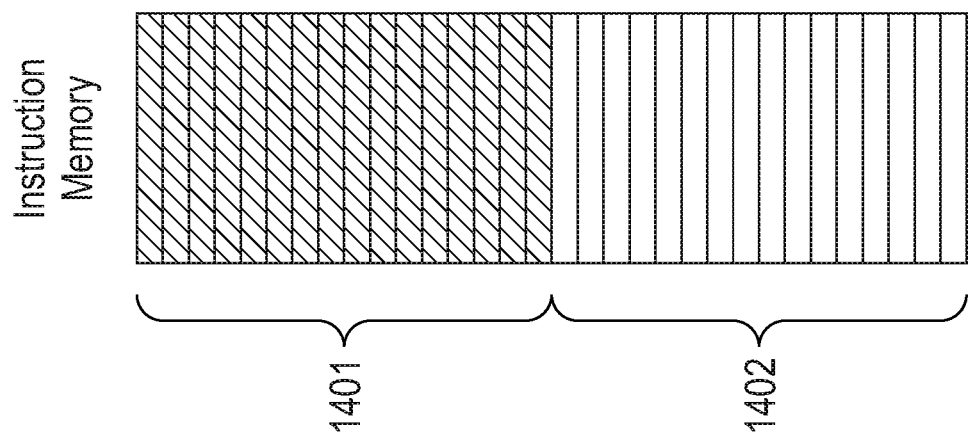
FIG. 14 illustrates distribution delay equalization and overlapping according to embodiments of the present disclosure.

Referring to FIG. 14, distribution delay equalization and overlapping is illustrated according to embodiments of the present disclosure. In various embodiments, core instruction memory 336 acts as a buffer. In particular, during the load process core instruction memories can fill at different times and rates. Execution can begin once all core instructions are loaded at each core. In some embodiments, during the execution process core instruction memories are static. Execution commencement is triggered by the synchronization signal as described above.

In some embodiments, overlapped distribution or dynamic distribution is provided. In such embodiments, core instruction memory 336 acts as a double buffer. The instruction memory is divided into two buffers 1401, 1402. In a first phase, the core reads and executes from buffer 1401 while new instructions for the next phase are written into buffer 1402. Once the new set of instructions have been written to buffer 1402 and the core has completed execution from buffer 1401, the buffers switch roles. In this next phase, buffer 1401 is the write buffer and buffer 1402 is the read buffer. For each phase, the buffers trade roles. In this way, instruction distribution (writing instructions to the write buffer) is overlapped with core execution (reading instructions from the read buffer). Thus, instructions may be distributed during core execution dynamically.

Figure 15:
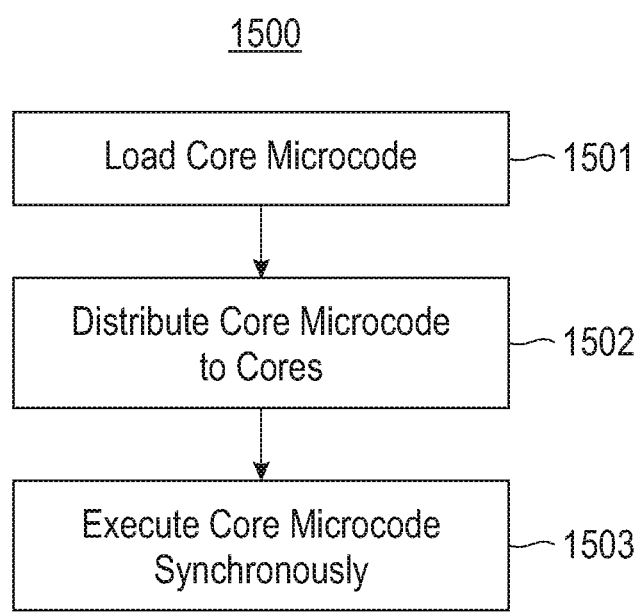
FIG. 15 illustrates a method for instruction distribution in an array of neural network cores according to embodiments of the present disclosure.

Referring to FIG. 15, a method for instruction distribution in an array of neural network cores is illustrated according to embodiments of the present disclosure. At 1501, a neural inference chip is initialized with core microcode. The chip comprises a plurality of neural cores. The core microcode is executable by the neural cores to execute a tensor operation of a neural network. At 1502, the core microcode is distributed to the plurality of neural cores via an on-chip network. At 1503, the core microcode is executed synchronously by the plurality of neural cores to compute a neural network layer.

Figure 16:
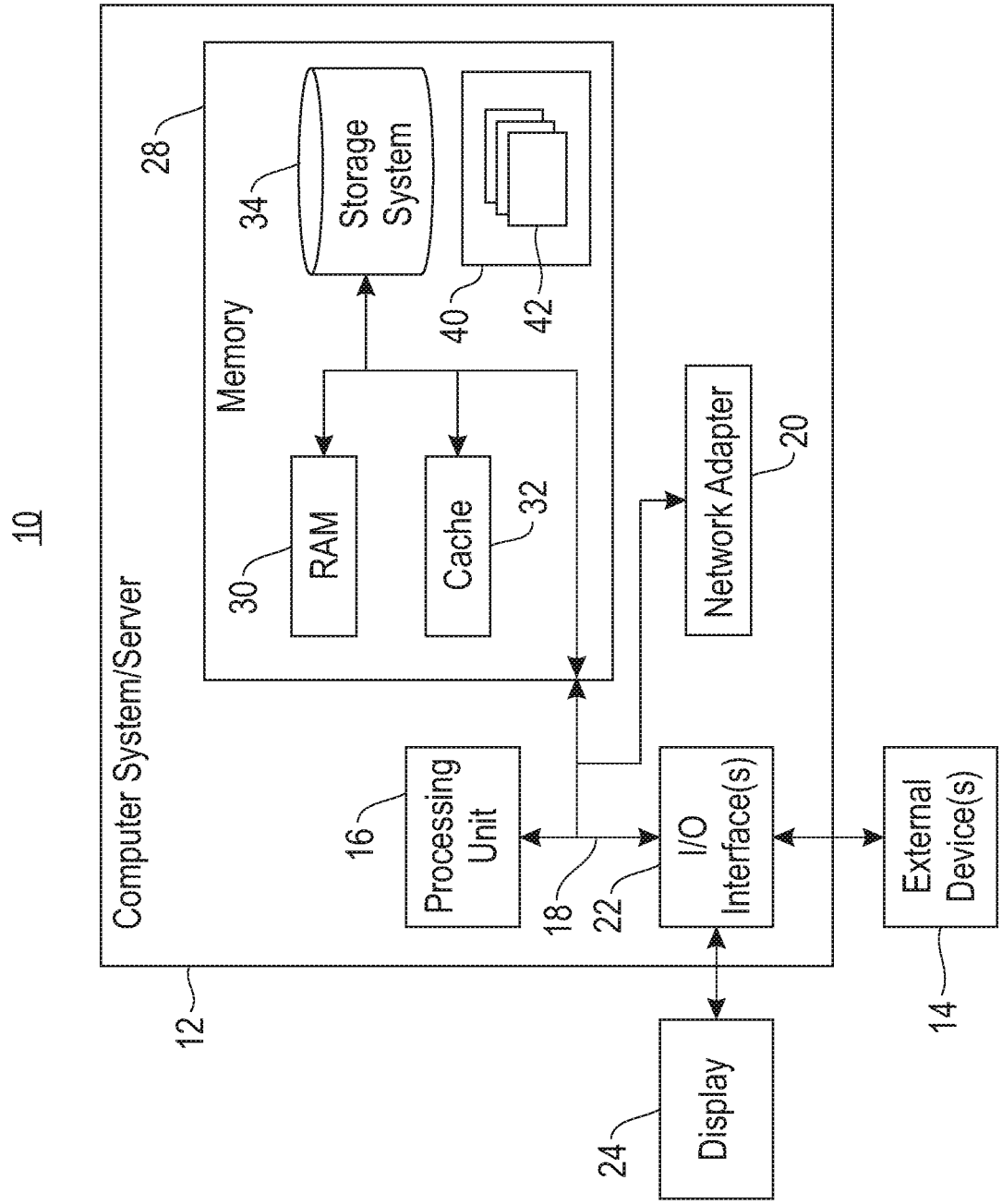
FIG. 16 depicts a computing node according to an embodiment of the present disclosure.

Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    initializing a neural inference chip with core microcode, the chip comprising a plurality of neural cores, the core microcode being executable by the neural cores to execute a tensor operation of a neural network;
    distributing the core microcode to the plurality of neural cores via an on-chip network, wherein each neural core of the plurality of neural cores stores the core microcode locally in a memory; and
    executing the core microcode synchronously by the plurality of neural cores to compute a neural network layer.

2. The method of claim 1, wherein identical core microcode is distributed to each of the plurality of neural cores.

3. The method of claim 2, wherein executing the core microcode by the plurality of neural cores comprises configuring the core microcode at each core according to configuration parameters at each core.

4. The method of claim 1, wherein different core microcode is distributed to each of the plurality of neural cores.

5. The method of claim 1, wherein different core microcode is distributed to at least one of the plurality of neural cores.

6. The method of claim 1, wherein the plurality of neural cores is grouped into a plurality of groups, and wherein different core microcode is distributed to each of the plurality of groups.

7. The method of claim 6, wherein the same microcode is distributed to the cores within each of the plurality of groups.

8. The method of claim 1, wherein the on-chip network comprises a tree structure.

9. The method of claim 1, wherein the on-chip network comprises at least one bus structure.

10. The method of claim 1, wherein the on-chip network comprises a systolic structure.

11. The method of claim 1, wherein the on-chip network comprises a packet-switched structure.

12. The method of claim 1, wherein the on-chip network distributes the core microcode to the plurality of neural cores by multicast.

13. The method of claim 1, further comprising:
    sending a synchronization signal to each of the plurality of cores from a chip-level controller, each of the plurality of cores executing the core microcode only upon receipt of the synchronization signal.

14. The method of claim 13, wherein no synchronization signal is sent between cores.

15. The method of claim 13, wherein each synchronization signal is sent by the chip-level controller through at least one intermediary controller to each of the plurality of cores.

16. The method of claim 13, wherein each synchronization signal comprises a delay value.

17. The method of claim 16, wherein each of the plurality of cores delays execution according to the delay value, thereby maintaining synchronization.

18. The method of claim 1, wherein each of the plurality of neural cores comprises an instruction buffer.

19. The method of claim 1, wherein each of the plurality of neural cores comprises an instruction double buffer.

20. The method of claim 19, wherein distributing the core microcode to the plurality of neural cores and executing the core microcode by the plurality of neural cores overlap.

21. The method of claim 1, wherein initializing the neural inference chip comprises storing the core microcode in a non-transitory shared memory.

22. The method of claim 21, wherein the core microcode is distributed from the non-transitory shared memory to the plurality of neural cores.

23. A neural inference chip comprising:
    a plurality of neural cores; and
    an on-chip network, wherein the neural inference chip is adapted to:
        receive core microcode, the core microcode being executable by the neural cores to execute a tensor operation of a neural network;
        distributing the core microcode to the plurality of neural cores via the on-chip network, wherein each neural core of the plurality of neural cores stores the core microcode locally in a memory; and executing the core microcode synchronously by the plurality of neural cores to compute a neural network layer.

24. The neural inference chip of claim 23, wherein the on-chip network comprises a tree structure, a bus structure, a systolic structure, or a packet-switched structure.

25. The neural inference chip of claim 23, further comprising a non-transitory shared memory, wherein the shared memory is adapted to store the core microcode upon initialization of the neural inference chip.

* * * * *